(12) United States Patent
Batterywala et al.

(10) Patent No.: US 7,660,790 B1
(45) Date of Patent: Feb. 9, 2010

(54) METHOD AND APPARATUS FOR UTILIZING A FILE CHANGE LOG

(75) Inventors: Yusuf Batterywala, Maharashtra (IN); Naga Kishore Kommuri, Pune (IN); Nookala Sunder Phani Kumar, Pune (IN); Sree Hari Nagaralu, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 683 days.

(21) Appl. No.: 11/064,557

(22) Filed: Feb. 24, 2005

(51) Int. Cl.
*G06F 17/30* (2006.01)

(52) U.S. Cl. .................................. 707/5; 707/2; 707/4

(58) Field of Classification Search ............. 707/1, 707/10, 202, 205, 2, 4, 5; 717/116, 106, 717/127; 713/201, 164, 185; 709/217, 221; 711/116; 382/100
See application file for complete search history.

(56) References Cited

U.S. PATENT DOCUMENTS

| | | | | |
|---|---|---|---|---|
| 5,778,392 | A * | 7/1998 | Stockman et al. | 707/205 |
| 6,311,213 | B2 * | 10/2001 | Dawson et al. | 709/217 |
| 6,505,300 | B2 * | 1/2003 | Chan et al. | 713/164 |
| 6,732,124 | B1 * | 5/2004 | Koseki et al. | 707/202 |
| 6,892,377 | B1 * | 5/2005 | White | 717/116 |
| 7,133,914 | B1 * | 11/2006 | Holbrook | 709/224 |
| 7,143,393 | B1 * | 11/2006 | Ezra et al. | 717/127 |
| 7,171,018 | B2 * | 1/2007 | Rhoads et al. | 382/100 |
| 7,174,417 | B2 * | 2/2007 | Kim et al. | 711/106 |
| 7,188,164 | B1 * | 3/2007 | Etheridge | 709/221 |
| 7,349,913 | B2 * | 3/2008 | Clark et al. | 707/101 |
| 2002/0019941 | A1 * | 2/2002 | Chan et al. | 713/185 |
| 2002/0083120 | A1 * | 6/2002 | Soltis | 709/200 |
| 2002/0116364 | A1 * | 8/2002 | Seki et al. | 707/1 |
| 2002/0152180 | A1 * | 10/2002 | Turgeon | 705/72 |
| 2002/0161855 | A1 * | 10/2002 | Manczak et al. | 709/219 |
| 2003/0055809 | A1 * | 3/2003 | Bhat | 707/1 |
| 2003/0144990 | A1 * | 7/2003 | Benelisha et al. | 707/1 |
| 2004/0148479 | A1 * | 7/2004 | Patel et al. | 711/163 |
| 2004/0168083 | A1 * | 8/2004 | Gasparini et al. | 713/201 |

* cited by examiner

*Primary Examiner*—Shahid A Alam
(74) *Attorney, Agent, or Firm*—Moser IP Law Group

(57) ABSTRACT

A method and apparatus for utilizing a file change log is described. In one example, the access of a file is initially detected. The identifier of the entity accessing the file is recorded. Similarly, an indicia of identifying at least one portion of the file that was accessed by the entity is recorded. The file change log is then updated to reflect the identifier and the indicia.

17 Claims, 4 Drawing Sheets

METHOD AND APPARATUS FOR UTILIZING A FILE CHANGE LOG

BACKGROUND OF THE INVENTION

1. Field of the Invention

Embodiments of the present invention generally relate to network file systems, and more particularly, to a method and apparatus for utilizing (e.g., updating and auditing) a file change log.

2. Description of the Related Art

Modern computer networks generally comprise a plurality of client computers connected to one another and to a computer server via a communication network. These client computers typically access the computer server for numerous reasons, such as accessing common files, databases, or directories. For reasons related to performance and security, a file change log (FCL) may be utilized to monitor and track client computer access to the computer server. The FCL typically stores the information that identifies files within a namespace that has recently been accessed (i.e., read from and/or written to). In some devices, the FCL itself may identify files that have been recently modified. Applications that utilize the FCL are normally software programs that are developed to scan the file system for changes, such as an indexing service, web search engines, or various backup applications. Namely, these applications can determine whether a file has been changed by accessing the FCL, thus abating the need to continuously scan the entire file system. Although the FCL identifies files that have been modified, the FCL in the device cannot presently identify the nature of the modification and/or pre- and post-modification values of the file.

Furthermore, even though the FCL has the capability to report the types of changes made to files, it does not have the ability to determine the identity of users or processes that access the files. In addition, the FCL is not capable of ascertaining the frequency with which a particular portion of a specific file has been accessed or modified. Either of these features would provide a valuable security measure for a network computer environment. Therefore, there is a need in the art for an improved method for utilizing the FCL in a manner that improves the security measures and performance of an existing file system.

SUMMARY OF THE INVENTION

The invention provides a method and apparatus for utilizing a file change log (FCL). In one embodiment, the access of a file is initially detected. The identifier of the entity accessing the file is then acquired. The invention subsequently records at least one indicia, which respectively identify the portions of the file accessed by the entity. The file change log is then updated to reflect the identifier and the indicia. Thus, the user's identity and the portion of the file that was accessed is monitored and recorded within the FCL. In another embodiment, a request for an access history associated with the identifier is received. The file change log is subsequently searched for the identifier and the access history of the identifier is produced. In this manner, the FCL can be used to provide access history for a given user as well as provide statistics regarding access such as access frequency, duration, and the like.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not intended to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
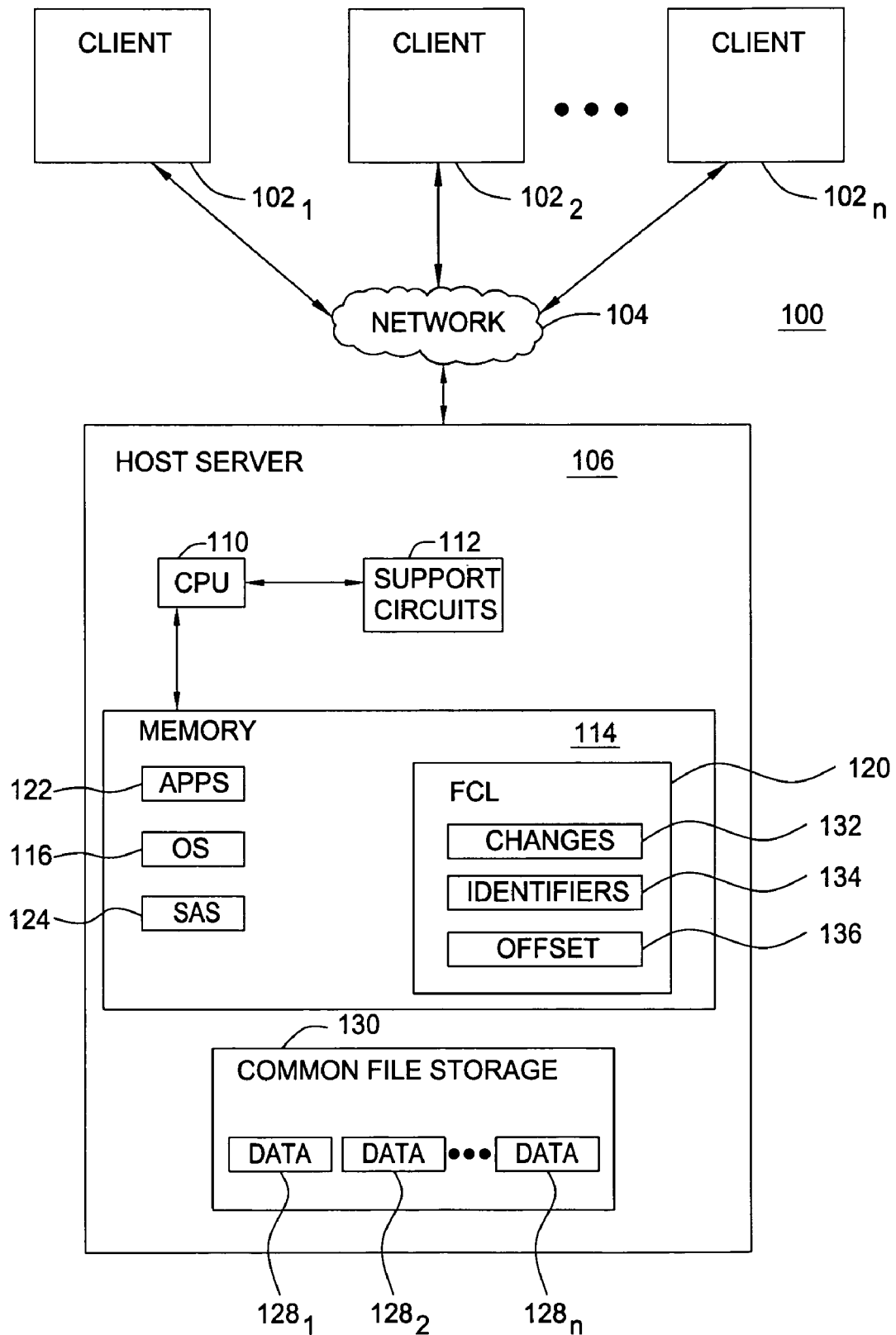
FIG. 1 depicts a block diagram of a computer network that operates in accordance with the present invention.

FIG. 1 depicts a computer network 100 in which the embodiments of the present invention may be utilized. This figure only portrays one variation of the myriad of possible network configurations. Although a network may contain a plurality of host servers, for simplicity and clarity, only one host server 106 is depicted in FIG. 1 and described below.

The computer network 100 comprises a plurality of client computers $102_1, 102_2 \ldots 102_n$ that are connected to one another through a conventional data communications network 104 (e.g., the Internet, a wide area network, or a local area network). The host server 106 is coupled to the communication network 104 to supply application and data services as well as other resource services to the client computers $102_{1 \ldots n}$.

The host server 106 comprises at least one central processing unit (CPU) 110, support circuits 112, memory 114, and a common file store 130. The CPU 110 may comprise one or more conventionally available microprocessors. The support circuits 112 are well known circuits used to promote functionality of the CPU 110. Such circuits include but are not limited to a cache, power supplies, clock circuits, input/output (I/O) circuits, and the like.

The memory 114 is coupled to the CPU 110 and may comprise random access memory, read only memory, removable disk memory, flash memory, optical read/write memory, cache memory, magnetic read/write memory, and various combinations of these types of memory. The memory 114 is sometimes referred to as main memory and may, in part, be used as cache memory or buffer memory. The memory 114 generally stores the operating system 116 of the host server 106, various forms of application software 122, a file change log (FCL) 120, and a searching application software (SAS) 124. The operating system 116 may be one of a number of commercially available operating systems such as, but not limited to, SOLARIS from SUN Microsystems, Inc., AIX from IBM Inc., HP-UX from Hewlett Packard Corporation, LINUX from Red Hat Software, WINDOWS 2000 from Microsoft Corporation, and the like. The common file store 130 is a storage unit that is used to contain files that are utilized by the client computers $102_{1...n}$ in the network 100. In one embodiment of the present invention, the common file store 130 contains a plurality of data files $128_{1...n}$ that may be accessed by a given entity originating from the client computers $102_{1...n}$, such as a process or user. In addition, the FCL 120 may be stored in the common file store 130 in one embodiment.

In a conventional manner, the FCL 120 tracks changes 132 to files and directories in a file system. The FCL 120 may be utilized by applications such as backup products, webcrawlers, search and indexing engines, and replication software that typically monitor an entire file system searching for modifications since the last scan. The searching application software 124 is an application that actually searches the common file store 130 to determine if files or data $128_{1...n}$ have been changed. More specifically, the searching application software 124 may determine which portions of a given file has been written or read. The searching application software 124 can also ascertain if entire files have been created, modified, or deleted as well.

The FCL 120 is improved with a capability of storing identification information 134 and file offset and length information 136. In one embodiment, the identification information includes entity identifiers. More specifically, the identifier of the entity accessing/changing the file may be: an effective user/group identifier (UID/GID), a real UID/GID identifier, a process identifier (PID), a command name, a session identifier, a TTY number, and the like. Furthermore, the entity identifier may be a combination of any of these listed identifiers, which are discussed in detail below. The file offset information 136 typically comprises an indicia representing the portion of the file being accessed. In one embodiment, the indicia is a tuple record stored in the FCL 120 that comprises two fields. These two fields are placeholders for data pertaining to the offset and length, respectively, of a read/write access (e.g., <offset, length>). Consequently, the FCL 120 is used to monitor and record user access and the portion of files that are accessed by users. This information can then be processed to determine user access statistics such as access frequency, access duration, file traits, and the like.

Figure 2:
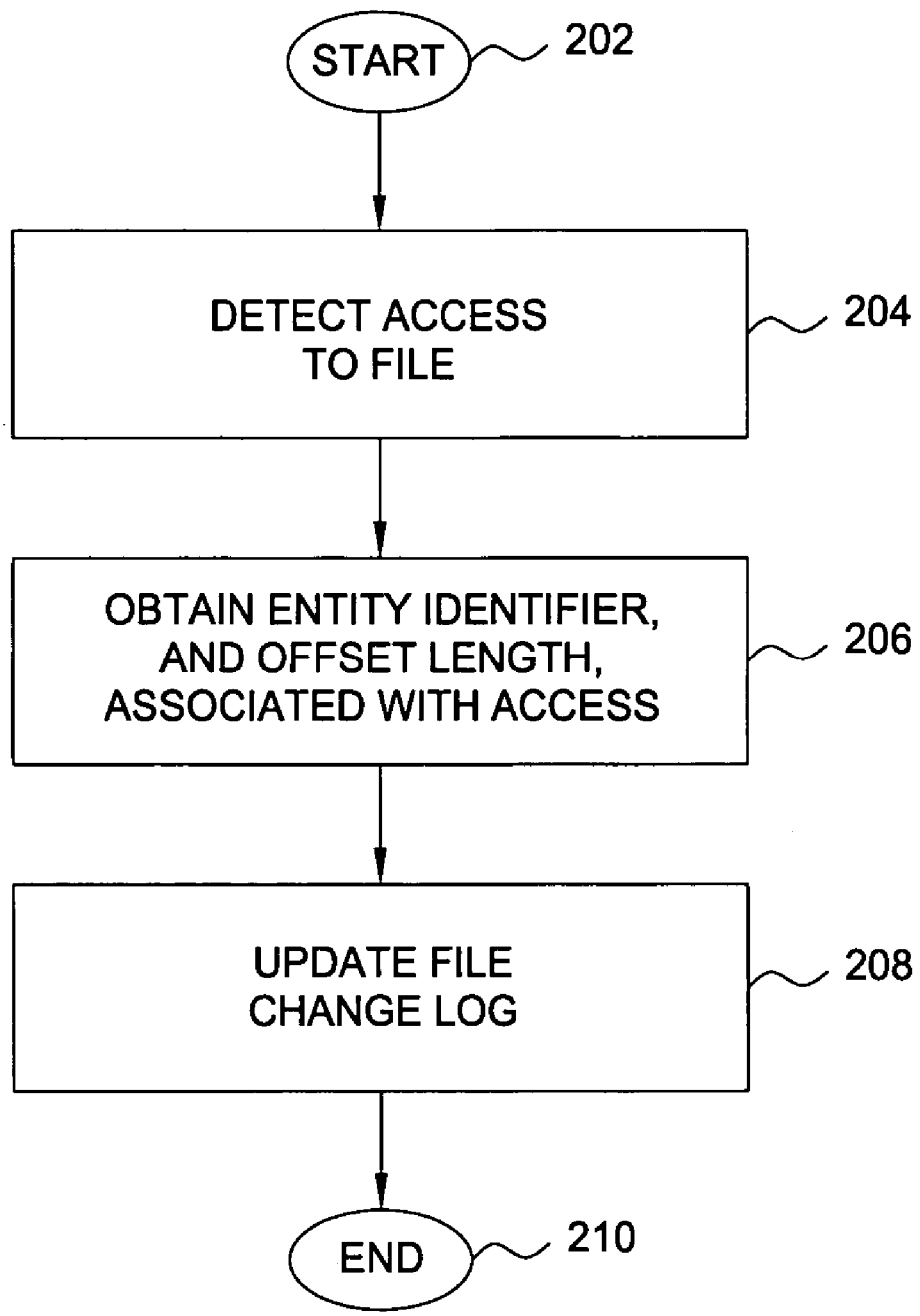
FIG. 2 depicts a flow diagram of a method for utilizing the file change log in accordance with the present invention.

FIG. 2 is a flow diagram depicting an exemplary embodiment of a method 200 for utilizing the file change log in accordance with the invention. Aspects of the method 200 may be understood with reference to FIG. 1. The method 200 begins at step 202. At step 204, file access is detected. In one embodiment, the file may be a database that is accessed by a user at client computer 102. Alternatively, the file may be accessed by a process.

At step 206, an entity identifier and offset indicia associated with the accessed file is acquired. In one embodiment, the entity identifier comprises a user identifier (UID), which may be a unique number or name of a particular user of a client computer or group of computers that share user information. The operating system 116 uses the UID to represent the user in its data structures (e.g., the owner of a file or process, the person attempting to access the system resource, etc.). Similarly, the entity identifier may be a group identifier (GID). In one embodiment, the GID is a unique number between 0 and 32767 that represents a set of users under UNIX. In another embodiment, the entity identifier may be a process identifier (PID) of a process that conducts the accessing operation. A PID is typically an integer used by the unit's kernel to uniquely identify a process. In another embodiment, the FCL 120 also records the effective UID/GID of the process executing an operation, the real UID/GID of the process, the PID, the command name (i.e., the name of the process), TTY number, and the session id.

The FCL also records whether a read or write (i.e., an access type) has been requested and a respective offset in the file (i.e., an indicia that indicates what portion of a file has been accessed). These read/write/offset records may be updated to the FCL 120 in a delayed fashion. In order to minimize the impact on performance, the offset indicia of the last read/write will be stored with a corresponding inode. An inode is a data structure that contains information about a corresponding file, such as, but not limited to: the file type, the access permissions, file size, and associated UID and GID.

At step 208, the method 200 updates the FCL 120. In one embodiment, the entity identifier and offset incidia obtained in step 206 is stored to the FCL 120. Thus, this auditing information incorporated in the FCL 120 provides a measure of security. The manner in which the FCL 120 is updated may be conducted in one of two ways. In one embodiment of the invention, the read/write <offset, length, entity identifier> record could be written to the FCL 120 in a delayed fashion. The corresponding records generated are linked with the data structure representing the file in memory, i.e., the in-core inode. These records are written to the FCL 120 periodically at specific time intervals. In the event a system crash occurs before the records are written to the FCL, the access information associated with the file would be lost. In another embodiment the read/write, <offset, length, entity identifier> records are written transactionally, i.e., before the read/write separation occurs. This ensures that every single access record associated with the accessed file will be accounted for by the FCL 120. The method 200 continues to step 210 where the process ends.

Figure 3:
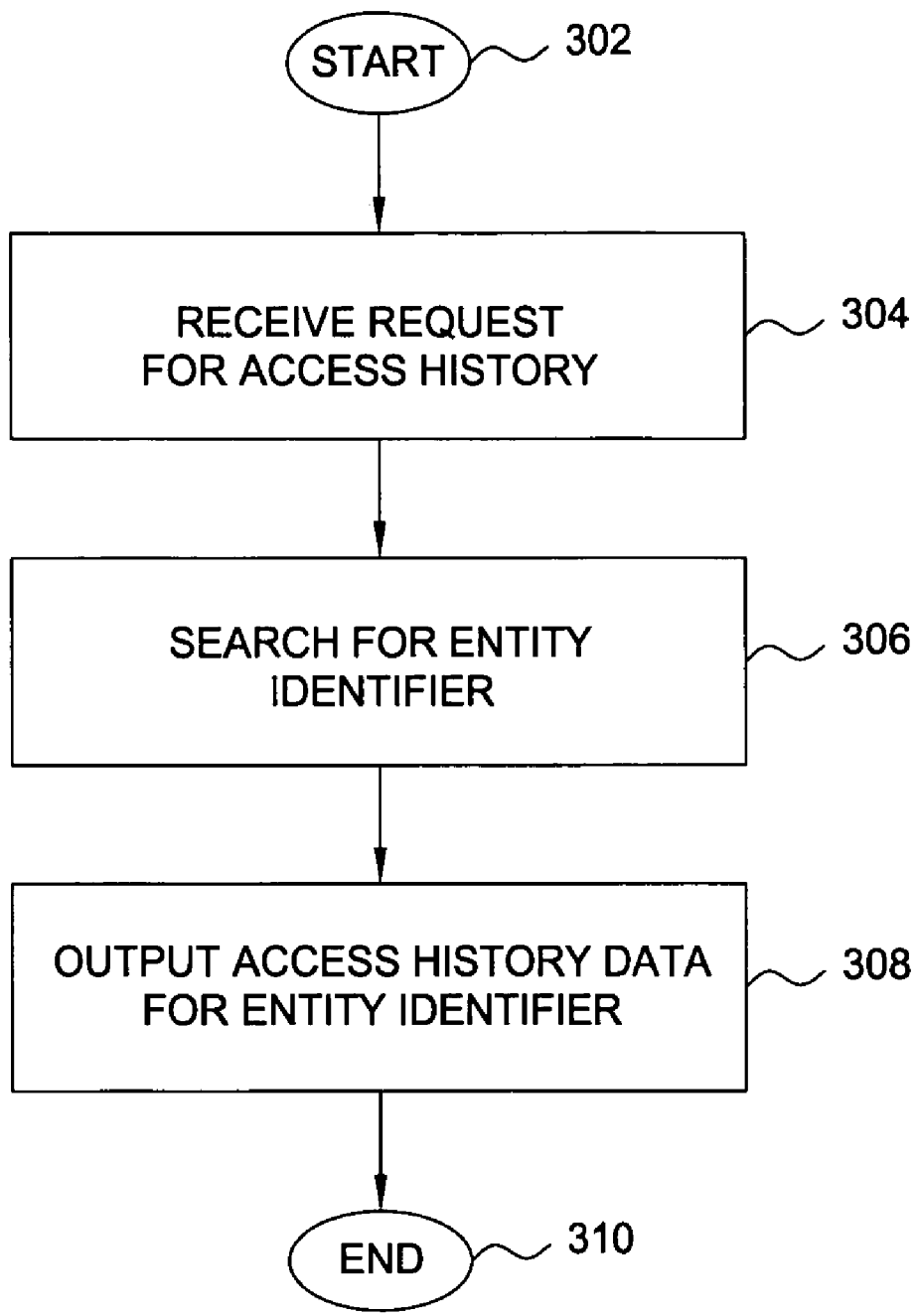
FIG. 3 depicts a flow diagram of a method for utilizing the file change log in accordance with the present invention.

FIG. 3 is a flow diagram depicting an exemplary embodiment of a method 300 for auditing the FCL 120. More specifically, a method 300 is a process for producing an access history associated with the entity identifier in accordance with the invention. Aspects of the method 300 may be understood with reference to FIG. 1 and FIG. 2. The method 300 begins at step 302. At step 304, the file change log (FCL 120) is accessed after a request for an identifier's access history is received. In one embodiment, the searching application software (SAS) 124 accesses the FCL 120 per the request of a system administrator. In another embodiment, the SAS 124 accesses the FCL 120 periodically in response to an automated access monitoring software program. In yet another embodiment, a request for access/change information for a particular file is made.

At step 306, the entity identifier is searched for by the SAS 124 in the common file store 130. In one embodiment, the user identifier (UID) is the subject for the search. In another embodiment, a process identifier (PID) is used as the basis of the search. In yet another embodiment, the FCL is searched for a filename/file identifier. At step 308, the access history associated with a given access identifier is produced. In one embodiment, a list of accessed files, including file names, the length of the file, and the offset of the read/write from the beginning of the file, is outputted to a screen display. Notably, the specific portions of particular files accessed (i.e., read/write) by a given entity (e.g., user or process) may be readily determined. The method 300 continues to step 310 and ends.

Figure 4:
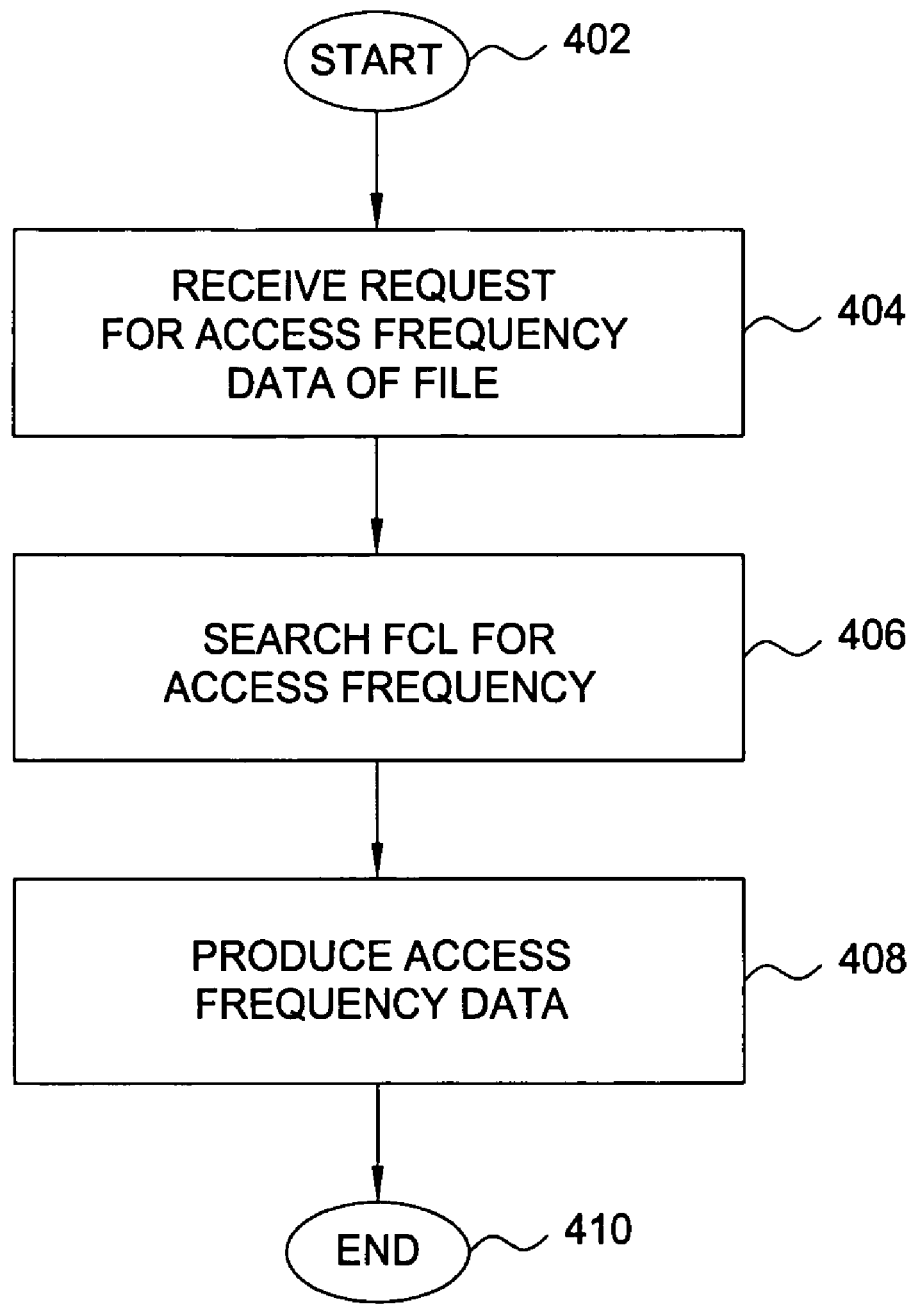
FIG. 4 depicts a flow diagram of another method for utilizing the file change log in accordance with the present invention.

FIG. 4 is a flow diagram depicting an exemplary embodiment of a method 400 for utilizing the FCL 120. More specifically, the method 400 is a process for determining the access frequency data associated with a file in accordance with the invention. Access frequency of regions in a file is one exemplary statistic of user activity that can be generated from the FCL. Those skilled in the art may compute a number of other statistics from the FCL information including access duration, access time of day, access type, and the like. Aspects of the method 400 may be understood with reference to FIG. 1 and FIG. 2. The method 400 begins at step 402. At step 404, a request is received for the access frequency data of a given file. At step 406, the method 400 accesses the FCL 120 and searches for instances of access to a file. In one embodiment, the SAS 124 determines which files in the network are frequently accessed by users and the software processes alike. Depending on the frequency in which a file is accessed, that file may be classified as a "hot" file or a "cold" file. Similarly, the access frequency may determine whether a file portion is classified as a "hotspot" or "coldspot". A hotspot is a portion of a file that is frequently read or written. Likewise, a coldspot is a portion of the file that is not frequently accessed or modified. More specifically, the hotspot may be classified as such by the total number of accesses of a given file portion that exceeds a predetermined threshold. Similarly, a coldspot may be determined by a number of accesses that does not exceed another threshold predetermined by a system administrator. At step 408, the access frequency data is provided. In one embodiment, the portions of files (designated by offset indicia) that have been frequently accessed (or infrequently accessed if a coldspot is desired) is outputted to a display screen. At step 410, the method 400 ends.

The output of method 400 enables the system administrator to conduct tasks that improve the performance of the computer network environment. For example, an administrator managing a multi-device file system (e.g., VERITAS file system) may configure the varying devices in order to optimize the system. Because each of the multiple devices may possess different operation speeds (e.g., a striped volume, a tape drive, etc.), designated cold-files may be transferred to a device with a slower access time and the hot-files could be moved to a faster device. Similarly, in the event file replication is required, the access frequency information may be used to increase the number of replicated copies of a hot-file while the number of cold-file replicated copies may be decreased.

In addition, knowledge of the access frequency of certain file regions (as opposed to the entire file) may also be useful toward improving the performance of the computer network. Notably, the administrator may enforce policies on a file region, thereby transferring the file data between various devices. Depending on the position of the hot spots within a file, the administrator may manipulate the file data location so that the data in the hot spots is located on a device with a fast access time. Conversely, the administrator may manipulate the file data location so that data in cold regions can reside on a slower device. Thus, the identification and subsequent repositioning of hot-spots/cold-spots (and/or hot files/cold files) may be used to improve the overall performance of the file system since hot/cold spots will be located on the appropriate devices.

In another embodiment, a tuple <region number, access count> pair may be used to determine the access frequency of various regions of the file instead of using a <offset, length> pair to identify an access or change. For a particular file, the system administrator may set the granularity of a file region. For example, given a file with a total size of 1 Gigabyte, the system administrator could designate a region size of 100 Megabytes. This would require the file to be divided into ten regions, each 100 Megabytes in size. Associated with the in-core inode (a data structure in memory that contains information about a corresponding file), the data structure used to represent a file in memory contains a list of all the regions in the file as well as the access/change counts associated with each region. Extending writes add new regions. This information about the regions accessed/changed regions could be recorded in the FCL. In one embodiment, this method is useful if the FCL records are updated in a delayed fashion, i.e., the records are flushed periodically.

The present invention enables system administrators and security personnel to identify breaches of security protocols, identify computer hackers, limit overuse, and alter server attributes to accommodate hotspots and coldspots. Similarly, this invention optimizes server operations in view of access statistics, such as access frequency, access duration, and file traits.

While the foregoing is directed to embodiments of the present invention, other and further embodiments of the invention may be devised without departing from the basic scope thereof, and the scope thereof is determined by the claims that follow.

What is claimed is:

1. A method of utilizing a file change log comprising:
    detecting access of a file;
    obtaining an entity identifier of an entity accessing said accessed file;
    recording an indicia of at least one portion of said file that was accessed by said entity;
    updating said file change log to reflect said identifier and said indicia;
    receiving a request for access frequency data of said accessed file;
    searching said file change log for at least one instance where a number of access entries of said at least one portion of said accessed file exceeds a first predetermined utilization threshold; and
    producing said access frequency data of said at least one portion of said accessed file associated with said at least one instance.

2. The method of claim 1, further comprising:
    receiving a request for access history of said identifier;
    searching said file change log for said identifier; and
    producing said access history associated with said identifier.

3. The method of claim 1, wherein said identifier and said indicia can be processed to determine user access statistics including at least one of:
    access frequency, access duration, access type, access time of day, and file traits.

4. The method of claim 1, wherein said updating step comprises:
    transactionally revising said file change log in the event said access comprises at least one of: creating said file and deleting said file.

5. The method of claim 1, wherein said updating step comprises:
    periodically revising said file change log in the event said access comprises at least one of: reading said file and writing said file.

6. The method of claim 1, wherein said identifier comprises at least one of: a process identifier, a user identifier, and a group identifier.

7. A method of utilizing a file change log comprising:
detecting access of a file;
obtaining an entity identifier of an entity accessing said accessed file;
recording an indicia of at least one portion of said file that was accessed by said entity;
updating said file change log to reflect said identifier and said indicia;
receiving a request for access frequency data of said accessed file; and
searching said file change log for at least one instance where a number of access entries of said at least one portion of said accessed file does not exceed a second predetermined utilization threshold; and
producing said access frequency data of said at least one portion of said accessed file associated with said at least one instance.

8. The method of claim 7, further comprising:
receiving a request for access history of said identifier;
searching said file change log for said identifier; and
producing said access history associated with said identifier.

9. The method of claim 7, wherein said identifier and said indicia can be processed to determine user access statistics including at least one of: access frequency, access duration, access type, access time of day, and file traits.

10. The method of claim 7, wherein said updating step comprises:
transactionally revising said file change log in the event said access comprises at least one of: creating said file and deleting said file.

11. The method of claim 7, wherein said updating step comprises:
periodically revising said file change log in the event said access comprises at least one of: reading said file and writing said file.

12. A computer for utilizing a file change log comprising:
a processor for detecting access of a file and obtaining an entity identifier of an entity accessing said accessed file; and
memory for recording an indicia of at least one portion of said file that was accessed by said entity;
where the processor updates said file change log to reflect said identifier and said indicia; and
where the processor receives a request for access frequency data of said accessed file; and
searches said file change log for at least one instance where a number of access entries of said at least one portion of said accessed file exceeds a first predetermined utilization threshold; and
produces said access frequency data of said at least one portion of said accessed file associated with said at least one instance.

13. The computer of claim 12, wherein the processor receives a request for access history of said identifier, searches said file change log for said identifier, and produces said access history associated with said identifier.

14. The computer of claim 12, wherein said identifier and said indicia can be processed to determine user access statistics including at least one of: access frequency, access duration, access type, access time of day, and file traits.

15. The computer of claim 12, wherein said processor transactionally revises said file change log in the event said access comprises at least one of: creating said file and deleting said file.

16. The computer of claim 12, wherein said processor periodically revises said file change log in the event said access comprises at least one of: reading said file and writing said file.

17. The computer of claim 12, wherein said identifier comprises at least one of: a process identifier, a user identifier, and a group identifier.

* * * * *